June 27, 1939. H. W. MILLMINE 2,164,159
PUMP ROD PROTECTING ASSEMBLY
Filed March 5, 1937
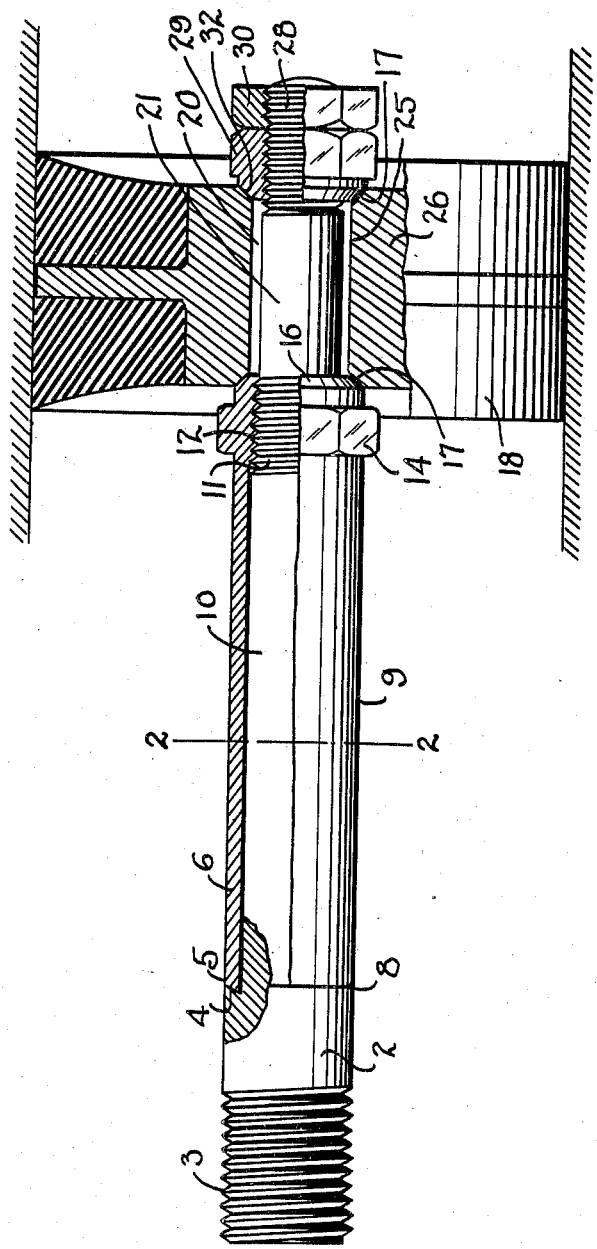
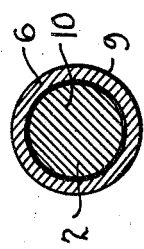
Inventor
H.W. MILLMINE.
Jesse R. Stone
+ Lester B Clark
By
Attorneys.

Patented June 27, 1939

2,164,159

UNITED STATES PATENT OFFICE 2,164,159

PUMP ROD PROTECTING ASSEMBLY

Herbert W. Millmine, Houston, Tex.

Application March 5, 1937, Serial No. 129,128

3 Claims. (Cl. 74—579)

The invention relates to a pump rod protecting assembly, particularly of the type to be used in protecting the sealing area on the rod of a slush pump used to circulate drilling fluid in the rotary method of drilling wells.

Pumps of this character maintain a circulation under very high pressure of an abrasive fluid made up of sand, mud, water and various chemicals. Needless to say, there is a great deal of wear on the pump rod where it passes through the usual stuffing box on the end of the cylinder in which the pump piston reciprocates. With pressures of five hundred, a thousand or fifteen hundred pounds per square inch which are to be maintained by a pump of this sort, it is obvious that no leakage can be permitted around the pump rod through the stuffing box at the end of the mud cylinder. It is the practice to tighten up the stuffing box until it binds very tightly about the pump rod with resultant wear on the pump rod.

Considerable difficulty has been encountered in the past by the tendency of the high pressure to flow in around various sleeve attachments which have been provided for protecting the surface of the rod against wear, but the present invention embodies a feature wherein a protective sleeve of hard, wear resistant material is disposed about the pump rod, which is of more ductile material which is of high tensile strength and which is tough in order to resist the stresses which are applied to it, wherein the sleeve and the means by which it is attached to the rod are integral.

It is one of the objects of the invention to provide a combination sleeve and nut construction which can be threaded on to a pump rod so as to abut the rod and the piston thereon.

Another object of the invention is to provide a combination sleeve, nut and piston support member to be telescoped over a slush pump rod.

Another object of the invention is to mount a slush pump piston on a rod in such a manner that the piston is supported by a sleeve enclosing the rod and by the retainer nuts so as to form a seal with the sleeve to prevent leakage beneath the sleeve.

Other and further objects of the invention will be readily apparent when the following description is considered in connection with the accompanying drawing, wherein:

Fig. 1 is a broken side elevation of a pump rod and piston to which the invention has been applied.

Fig. 2 is a section taken on the line 2—2 of Fig. 1.

In Fig. 1 the pump rod is indicated generally at 2 and is made up of a body of more or less ductile steel which has a high tensile strength so that it can absorb the strains and stresses of tension and compression which are applied to it. This rod, as is usual with rods of this type, is threaded at 3 in order to be received in the pump construction whereby it is reciprocated. A shoulder 4 is provided on the rod adjacent the threaded connection 3, and as seen, this shoulder is undercut in order to provide a suitable fit for the end 5 of the protective sleeve 6.

This sleeve is preferably of a wear resistant material such as a heat treated steel and is of a length so that it will extend through the stuffing box of the mud cylinder of the pump during reciprocation of the rod, it being intended that the piston 8 between the sleeve 6 and the rod 2 will never pass through the stuffing box, and that all of the wear of the stuffing box will be applied to the surface 9 of the sleeve 6.

A sleeve of this sort which has wear resistant properties is desirable because it does not embody a substantial thickness and may be made up independently and properly heat treated to obtain the desired hardness. Such heat treatment on the other hand is very objectionable when applied to a rod such as 2 because of the thickness thereof and because of the fact that it is impossible to treat a rod such as 2 uniformly by a heat treating process, particularly where the rod is of different diameters, because where differences in diameters occur there will be stresses set up during the quenching operation in the heat treating process. This is true because the smaller portions of the rod will naturally cool quicker than the larger portions and resultant crystallizing or destruction of the grain structure of the rod will occur.

In a pump rod of this sort it is desirable that the rod be more or less ductile or have a high tensile strength in order to transmit the power to the piston, and naturally a rod having these properties would not resist abrasion.

The sleeve 6 will therefore be a heat treated sleeve whose end is beveled in order to be received against the shoulder 4. This sleeve may be telescoped over the reduced area 10 of the rod and will be engaged upon the threads 11 on the rod because of the internal threads 12 on the inside of the extreme right end of the sleeve 6. In order that the sleeve may be securely screwed into position a noncircular nut portion 14 has been formed integral with the sleeve on the periphery thereof outside of the threads 12.

These interengaging threads 11 and 12 have a dual purpose in that they are used to fix the sleeve in position on the rod and to transmit the stresses from the sleeve to the rod and then they are also available when the sleeve 6 is to be removed because turning of the sleeve unscrews the threads and tends to withdraw the sleeve from its position on the rod. In many instances moisture accumulates under the rod and corrosion sets in so that after a period of operation difficulty might be encountered in withdrawing the sleeve if it were not for the provision of this threading arrangement for positive removal of the sleeve from the rod.

Beyond the nut portion 14 the rod is formed with a beveled shoulder 16 against which the beveled face 17 on the piston 18 is adapted to abut. In this manner a suitable seal is formed between the piston and the sleeve so that there can be no inflow of fluid into the chamber 20 between the reduced portion 21 of the rod 2. This reduced or extension portion 21 of the rod 2 is formed beyond the threads 11 and is arranged to pass through the opening or passage 25 in the hub 26 of the piston.

The extreme end of this extension 21 is threaded at 28 to receive the retainer nut 29 and the lock nut 30. The nut 29 has a beveled face 32 which engages with the beveled face 17 on the piston in order to form a seal therewith.

Specifically, the invention provides an integral nut and sleeve arrangement so that there is no leakage along the rod from the piston. In the past where a sleeve, and nut construction for holding it in position, were provided, considerable diculty was encountered due to leakage around the nut or underneath the sleeve when higher pressures were encountered, but with the present construction there is no seal between the sleeve and the nut because they are formed integral and only one seal is necessary between the end of the sleeve and the piston.

What is claimed is:

1. A wear resistant sleeve for slush pump rods comprising a body of heat treated metal, one end thereof being shaped to abut a shoulder on the rod, the other end having an external nut portion integral therewith, a threaded portion internally of the nut portion so that said sleeve may be rotated to screw it onto the rod and rotated reversely to jack it off of said rod in event it adheres to the rod, and a beveled end on said sleeve beyond said nut portion to receive the slush pump piston.

2. A rod and sleeve assembly including a one-piece nut, a cylindrical extension sleeve integral therewith at one end, said sleeve being resistant to abrasive to a greater extent than said rod, a shoulder on said rod against which said sleeve will abut, said sleeve being of a length to extend through the stuffing box so that the joint between said rod shoulder and the end of said sleeve will not pass through the stuffing box during reciprocation of the rod, and interengaging threaded portions on said rod and sleeve so that said nut may be utilized to tighten and release said sleeve.

3. A wear resistant sleeve for slush pump rods comprising a body of heat treated metal, one end thereof being shaped to abut a shoulder on the rod, the other end having an external nut portion integral therewith, a threaded portion internally of the nut portion so that said sleeve may be rotated to screw it onto the rod and rotated reversely to jack it off of said rod in event it adheres to the rod.

HERBERT W. MILLMINE.